United States Patent
Dunkelberger et al.

(10) Patent No.: US 9,981,740 B2
(45) Date of Patent: May 29, 2018

(54) LAYERED ARCHITECTURE FOR CUSTOMER PAYLOAD SYSTEMS

(75) Inventors: Troy T. Dunkelberger, South Riding, VA (US); Justin Adkins, Clifton, VA (US)

(73) Assignee: Northrup Grumman Systems Corporation, Los Angeles, CA (US)

( * ) Notice: Subject to any disclaimer, the term of this patent is extended or adjusted under 35 U.S.C. 154(b) by 1414 days.

(21) Appl. No.: 12/852,159

(22) Filed: Aug. 6, 2010

(65) Prior Publication Data

US 2012/0035787 A1 Feb. 9, 2012

(51) Int. Cl.
*B64C 39/00* (2006.01)
*G06F 17/00* (2006.01)
*B64C 39/02* (2006.01)

(52) U.S. Cl.
CPC ...... *B64C 39/024* (2013.01); *B64C 2201/126* (2013.01)

(58) Field of Classification Search
CPC ........................ B64C 39/024; B64C 2201/126
USPC ......... 701/1–4, 13, 11, 23, 24, 36, 230, 238, 701/250; 370/230, 252, 310, 328, 338, 370/345, 350, 465–469; 244/75.1, 118.1, 244/190; 709/223, 227, 230; 719/328
See application file for complete search history.

(56) References Cited

U.S. PATENT DOCUMENTS

| | | | |
|---|---|---|---|
| 6,665,594 B1 * | 12/2003 | Armstrong | 701/13 |
| 6,856,894 B1 * | 2/2005 | Bodin et al. | 701/2 |
| 6,873,886 B1 * | 3/2005 | Mullen et al. | 701/2 |
| 7,509,212 B2 * | 3/2009 | Bodin et al. | 701/528 |
| 7,778,744 B2 * | 8/2010 | Rath et al. | 701/3 |
| 7,970,532 B2 * | 6/2011 | Tehan et al. | 701/423 |
| 8,068,949 B2 * | 11/2011 | Duggan et al. | 701/24 |
| 8,068,950 B2 * | 11/2011 | Duggan et al. | 701/24 |
| 8,082,074 B2 * | 12/2011 | Duggan et al. | 701/24 |
| 8,103,398 B2 * | 1/2012 | Duggan et al. | 701/24 |
| 2005/0004723 A1 * | 1/2005 | Duggan et al. | 701/24 |
| 2005/0090945 A1 * | 4/2005 | Bodin et al. | 701/2 |
| 2005/0090972 A1 * | 4/2005 | Bodin et al. | 701/206 |
| 2006/0058928 A1 * | 3/2006 | Beard et al. | 701/11 |

(Continued)

*Primary Examiner* — Khoi H Tran
*Assistant Examiner* — Majdi Alsomiri
(74) *Attorney, Agent, or Firm* — Katten Muchin Rosenman LLP

(57) ABSTRACT

A layered architecture for customer payload systems is disclosed to provide a scalable, reconfigurable integration platform targeted at multiple unmanned aerial vehicles (UAV), and remove both UAV specific and payload equipment specific characteristics that increase complexity during integration. The layered architecture is a modular design architecture that is split by function. Standard interfaces are implemented between functional layers to increase reconfiguration possibilities and to allow reuse of existing components and layers without modification to the payload or UAV. The standard interfaces also promote easy connection and disconnection from other layer components. Additionally, once the layered architecture is implemented, technological or functional requirements changes can be isolated to one specific component layer, not the entire payload stack. As a result, payload designs based on the layered architecture reduces design time and cost, and allows for easier integration, operation, upgrades, maintenance, and repair.

29 Claims, 17 Drawing Sheets

(56) References Cited

U.S. PATENT DOCUMENTS

2009/0125163 A1* 5/2009 Duggan et al. ................... 701/2
2010/0145556 A1* 6/2010 Christenson et al. .......... 701/15
2011/0035149 A1* 2/2011 McAndrew et al. ......... 701/205
2011/0084162 A1* 4/2011 Goossen et al. ............. 244/12.1

* cited by examiner

US 9,981,740 B2

LAYERED ARCHITECTURE FOR CUSTOMER PAYLOAD SYSTEMS

BACKGROUND

An unmanned aerial vehicle ("UAV") (also known as a remotely piloted vehicle ("RPV") or unmanned aircraft system ("UAS")) is an aircraft that flies without a human crew on board the aircraft. A UAV is capable of controlled, sustained, level flight and is powered by a jet engine, reciprocating engine, or electric motor.

For UAVs, unique airborne payloads were previously designed for each government furnished equipment (GFE), customer or application specific system during integration. The airborne payloads were unique with respect to the customer payload equipment, the communications system, and the UAV platform used for integration. This design methodology limited component reuse, increased build complexity, and generally required longer development cycles.

Specifically, UAV payloads were previously designed for a particular UAV platform based on specific mission objectives and concept of operations (CONOPS). The size, weight, and power requirements of the UAV platform were the main system requirements that drove the payload design. After a payload was developed for a given set of sensor equipment, communications system, and for a particular platform; reuse of that payload on other platforms required extensive redesign or added size, weight, and power to adapt the payload to new platforms. Above all, the added size, weight, and power to adapt previous payload designs to new platforms is a serious detriment to the UAV's mission performance because it can greatly reduce a number of important operating characteristics such as, time on station, maximum altitude and range, safe operating conditions, and the like.

Drawbacks of the existing approach included: 1) reduced UAV mission performance due to added size, weight, and power required for payload integration; 2) payload designs could not easily address the mechanical and electrical interfaces of multiple vehicles simultaneously; 3) new requirements (sensor, communications, platform) typically drove a new payload design; 4) time and cost for payload design modifications were high; 5 payloads were not easily field repairable due to construction; 6) reuse between different platforms was limited or non-existent in some cases; 7) payloads were bulky in size and weight when reuse on another platform was possible due to added equipment to adapt to new platforms; 8) payloads did not benefit from overlapping functionality of subsystem components which enable a single design element to perform multiple tasks such as mechanical structure, environmental isolation, thermal conduit, electromagnetic shielding, electrical power conduction, and so on; and 9) payloads could not easily add redundant or multi-channel support through the simple addition of extra layers, but instead had to be specifically re-engineered for the requirements of each project.

DESCRIPTION OF THE DRAWINGS

The detailed description will refer to the following drawings, wherein like numerals refer to like elements, and wherein:

FIG. 16 is a bar graph illustrating a comparison of a number of UAVs each payload may operate using an embodiment of the layered architecture and a number of UAVs each payload was required to operate on.

DETAILED DESCRIPTION

Figure 1:
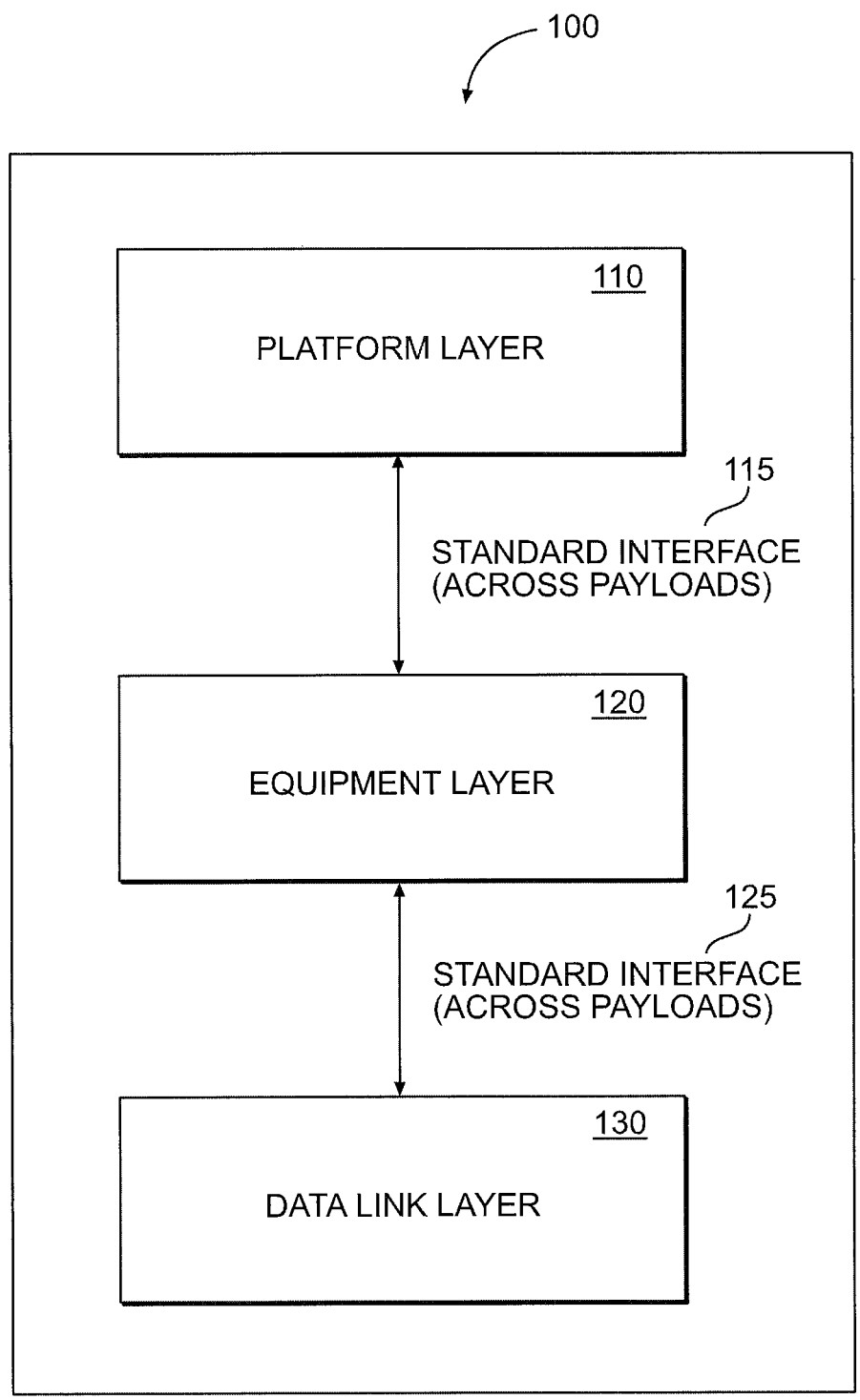
FIG. 1 illustrates an embodiment of an exemplary layered architecture for customer payload systems.

FIG. 1 illustrates an embodiment of a layered architecture for providing a layered architecture for customer payload systems. Specifically, a layered architecture 100 provides a scalable, reconfigurable integration platform targeted at multiple unmanned aerial vehicles (UAV) (e.g., aircraft), and removes both UAV specific and government furnished equipment (GFE), customer, or application payload system specific characteristics that increase complexity during integration.

The layered architecture 100 provides a modular design for payloads that is split by function and decouples the GFE system, i.e., sensor system, from the platform and communications system. Standard interfaces are defined and implemented between functional layers to allow reuse of existing components and layers without modification. The standard interfaces also promote easy connection and disconnection from other layer components. For example, an empty equipment layer bay may accept a wide range of sensor systems for integration. Additionally, once the layered architecture 100 is implemented, technological or functional requirements changes can be isolated to one specific component layer, not the entire payload stack.

The layered architecture 100 meets the time and effort constraints associated with many quick reaction capability (QRC) projects. The layered architecture 100 provides for additional flexibility in payload design to allow greater numbers of sensor systems to be easily integrated on a wide variety of UAV platforms. The layered architecture 100 also addresses the issue of minimizing size, weight, and power, while increasing environmental, electromagnetic interference (EMI), and thermal protection measures.

Due to the unique stacking (or serialized) architecture, mechanical interfaces can be simplified to reduce size and weight, and can also act in a multi-use role as one layer floor and the next layer lid concurrently, or provide structural integrity and environmental protection simultaneously. Similarly, the stacking architecture provides the electrical interfaces to be double-sided, which allows for countless layer reconfigurations to meet new mission requirements, as well as allowing module redundancy as needed.

As a result, payload designs based on the layered architecture 100 may support multiple platforms and increase mission capability, while reducing size, weight, and power, design complexity, time and cost, and allow for easier operation, maintenance, field repair, and upgrades while experiencing increased system robustness and performance.

Referring to FIG. 1, an embodiment of the layered architecture 100 includes a platform layer 110, an equipment layer 120, and a data link layer 130. Without loss of generality, the double-sided interface allows for various ordering arrangements of the modules and the invention is not restricted to the configuration of FIG. 1. For example, the invention could accommodate a configuration where only a platform layer and a data link layer are used. An alternative configuration, for example, may include a platform layer, followed by at least one equipment layer module, without using the data link layer at all. The double-sided interface of the invention allows for various arrangements of modules resulting in various functional possibilities. FIG. 1 illustrates how a system of layers may be used to support operation on a range of miniature UAVs. As detailed later, the platform layer 110 standardizes mechanical interfaces (e.g., physical mounting) and electrical interfaces of a UAV, e.g., aircraft. The platform layer 110 may provide power from a UAV 310 (shown in FIG. 3) to other layers, and may provide data paths between the UAV 310 and the equipment layer 120. The equipment layer 120 contains customer payload equipment 320 (shown in FIG. 3) and any peripheral components unique to the customer payload equipment 320, and may communicate to ground equipment using the platform layer 110 or the data link layer 130. The data link layer 130 may contain a data link transceiver used for controlling the customer payload equipment, and may include other peripheral equipment, such as global positioning systems (GPS), power supplies, voltage regulators, signal distribution systems, or the like.

A standard interface 115 may be provided between the platform layer 110 and the equipment layer 120 to enable numerous platform and equipment layer modules (i.e., system components) to be compatible with each other. The standard interface 115 defines all mechanical information for mechanically mating the platform layer 110 and the equipment layer 120, such as mating and mounting schemes, mounting holes, connector type, connector location, and the like. Similarly, the standard interface 115 defines all electrical information for electrically mating the platform layer 110 and the equipment layer 120, such as electrical interfaces, pin assignment, connector gender, and the like. Likewise, a standard interface 125 may be provided between the equipment layer 120 and the data link layer 130. When multiple variants of the platform layer 110, the equipment layer 120 and the data link layer 130 are built to the requirements of the standard interfaces 115 and 125, the design of the standard interfaces 115 and 125 allows any data link layer 130 to mate to any platform layer 110 or equipment layer 120.

Figure 2:
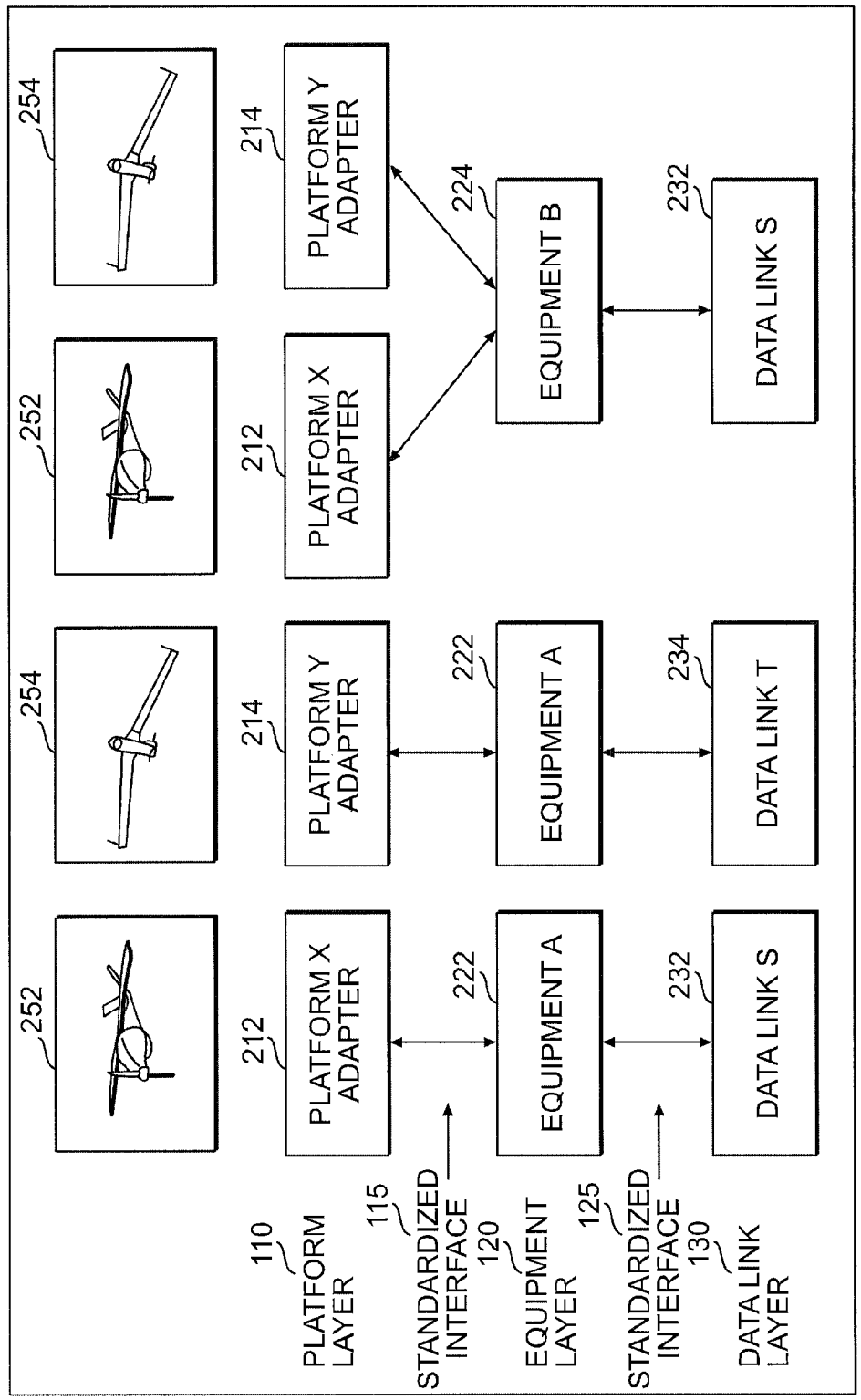
FIG. 2 is an exemplary operational view of the layered architecture of FIG. 1.

FIG. 2 is an exemplary operational view of the layered architecture 100 of FIG. 1. The layered architecture 100 provides a baseline approach for easy integration of customer payload equipment into multiple, UAVs, such as the TFP, BAT, Stalker and ScanEagle. Customer payload equipment, such as Equipment A 222 and Equipment B 224, can quickly and easily integrate into the equipment layer 120 using the standard interfaces 115 to obtain power and communicate using the standard interfaces 115 or 125. For example, for UAV 252, Equipment A 222 can quickly attach to Platform X Adapter 212 and communicate with Data Link S 232. As another example, for UAV 254, Equipment A 222 can attach to Platform Y Adapter 214 and communicate with Data Link T 234. As a further example, Equipment B 224 of another UAV 252 can attach to Platform X Adapter 212 and communicate with Data Link S 232. As yet another example, for UAV 254, Equipment B 224 can attach to Platform Y Adapter 214 and communicate with Data Link S 232. Customer payload equipment only needs to fit within the size, weight, and power profile of the equipment layer 120 and the desired UAV 310 for operation. Multiple variants exist for each layer of the layered architecture 100, allowing operation in multiple UAVs and the use of multiple types of data links and customer payload systems. In short, the layered architecture 100 provides a generic platform that accepts customer payload equipment and provides flexible electrical and mechanical interfaces between numerous UAVs.

Figure 3:
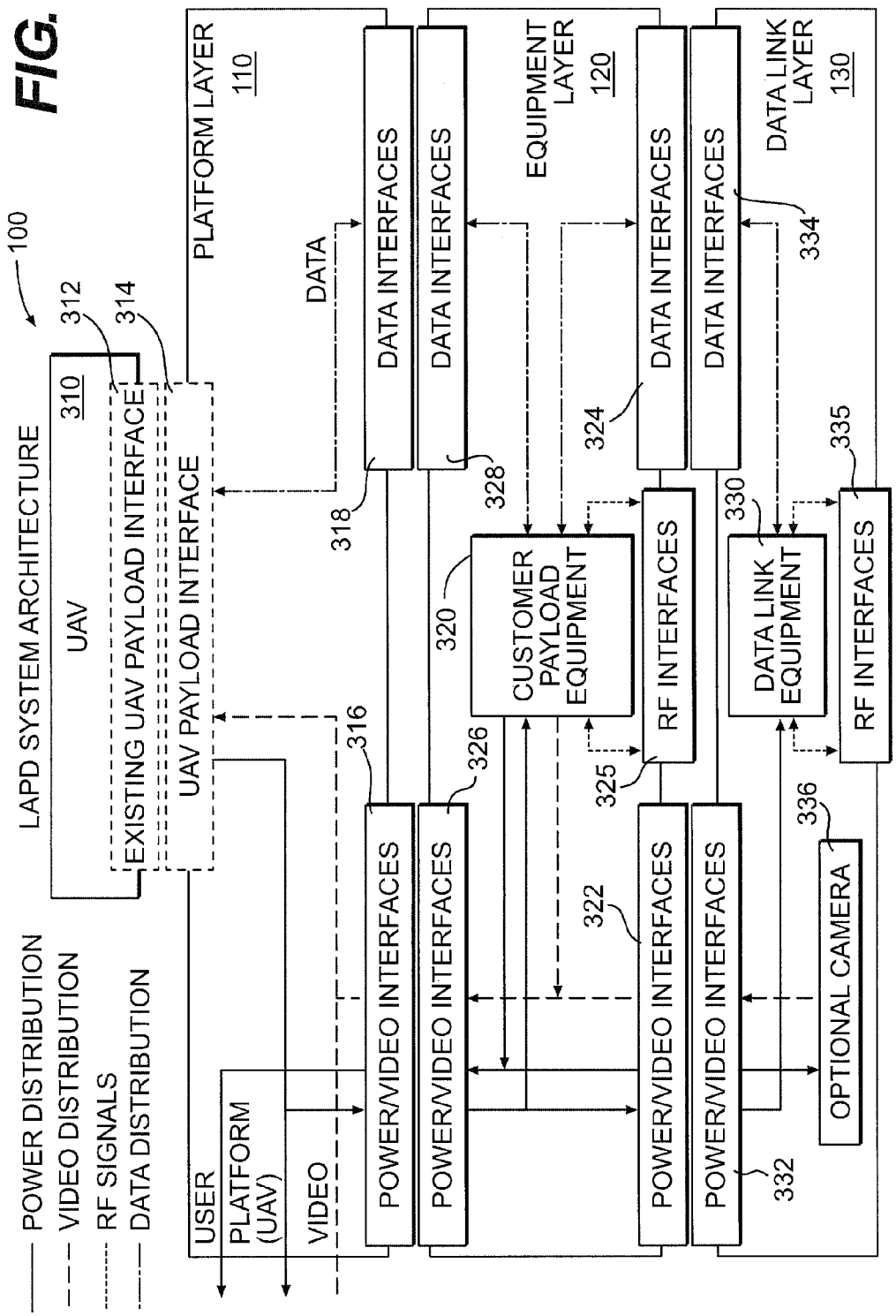
FIG. 3 is a high-level system block diagram illustrating an embodiment of the layered architecture of FIG. 1.

FIG. 3 is a high-level system block diagram illustrating an embodiment of the layered architecture 100. Due to the modularity of the layered architecture 100, several variations of each layer are possible. As noted above, the layered architecture 100 includes the platform layer 110, the equipment layer 120, and the data link layer 130. Customer payload equipment 320 is installed in the equipment layer 120. Power distribution is shown with solid lines, video distribution is shown with long dash lines, data distribution is shown with long and short dash lines, and radio frequency (RF) signals are shown with short dash lines. Power may be supplied from an UAV 310 to the platform layer 110 using an existing UAV payload interface 312 and an UAV payload interface 314 that is built into the platform layer 110. The UAV payload interface 314 may be, for example, a cable that plugs into the UAV 310 on one end and the platform layer 110 on the other end. The power may be routed from the platform layer 110 to the equipment layer 120 and the data link layer 130 using, for example, power/video interfaces 316, 326, 322, 332. The power/video interface 316 may be, for example, the physical connector end for the standard interface 115 on the platform layer 110, whereas the power/video interface 326 may be the physical connector end for the standard interface 115 on the equipment layer 120. Likewise, the power/video interface 322 may be, for example, the physical connector end for the standard interface 125 on the equipment layer 120, whereas the power/video interface 332 may be the physical connector end for the standard interface 125 on the data link layer 130. Power can be sent directly to the customer payload equipment 320 or to voltage regulators or other power equipment integrated into the equipment layer 120 for additional voltage levels needed by a user. The choice may be application specific and dependent upon mission requirements.

Video sources, such as a camera 336, may be embedded into the customer payload equipment 320, the data link layer 130, or external to the layered architecture 100. Video data may be routed from the layered architecture 100 through the platform layer 110 to the UAV payload interface 314 and then transmitted to a UAV ground control station (not shown) using the existing video data link and bandwidth provide by the UAV 310.

Bi-directional command and control data may also be passed between the aircraft and the layered architecture 100 through the UAV payload interface 314 and data interfaces 318, 328, 324, 334, if the UAV 310 supports this communication functionality for payloads. The data interface 318 may be, for example, the physical connector end for the standard interface 115 on the platform layer 110, whereas the data interface 328 may be the physical connector end for the standard interface 115 on the equipment layer 120. Likewise, the data interface 324 may be, for example, the physical connector end for the standard interface 125 on the equipment layer 120, whereas the data interface 334 may be the physical connector end for the standard interface 125 on the data link layer 130. Any data protocol translations from the UAV supported protocol to other protocols may be performed in the equipment layer 120, when needed by the customer payload equipment 320. In the event that data communications for the customer payload equipment 320 cannot use the UAV's data link for command and control, the data link layer 130 can provide this functionality.

The equipment layer 120 may include, for example, multiple RF interfaces 325 for equipment or systems that need RF connections. Similarly, the data link layer 130 may include, for example, multiple RF interfaces 335 for equipment or systems, such as data link equipment 330, that need RF connections.

The layered architecture 100 may be used with many existing UAV systems, including the TFP, BAT, Stalker and ScanEagle UAV systems, using the TFP platform layer, BAT platform layer, Stalker platform layer and ScanEagle platform layer, respectively. The layered architecture 100 is easily expandable with the creation of a new platform layer 110 for each new UAV. The layered architecture 100 also provides flexible solutions for data links used for payload command and control functions. The layered architecture 100 may include data link transceiver options that support varying data interface types using the data link layer 130, such as serial, Ethernet, universal serial bus (USB), and general purpose input/output (I/O). Additional UAVs and/or data links can be further supported in the future as needed. This flexibility in platform and data link compatibility allows customers to make an appropriate selection of equipment criteria based on the payload equipment requirements, such as size, weight, power, data communications, and mission requirements. Any customer payload equipment 320 that conforms to the size, weight, and power requirements of the equipment layer 120 and the UAV 310 can be mounted directly within the equipment layer 120 for quick installation and integration.

Figure 4:
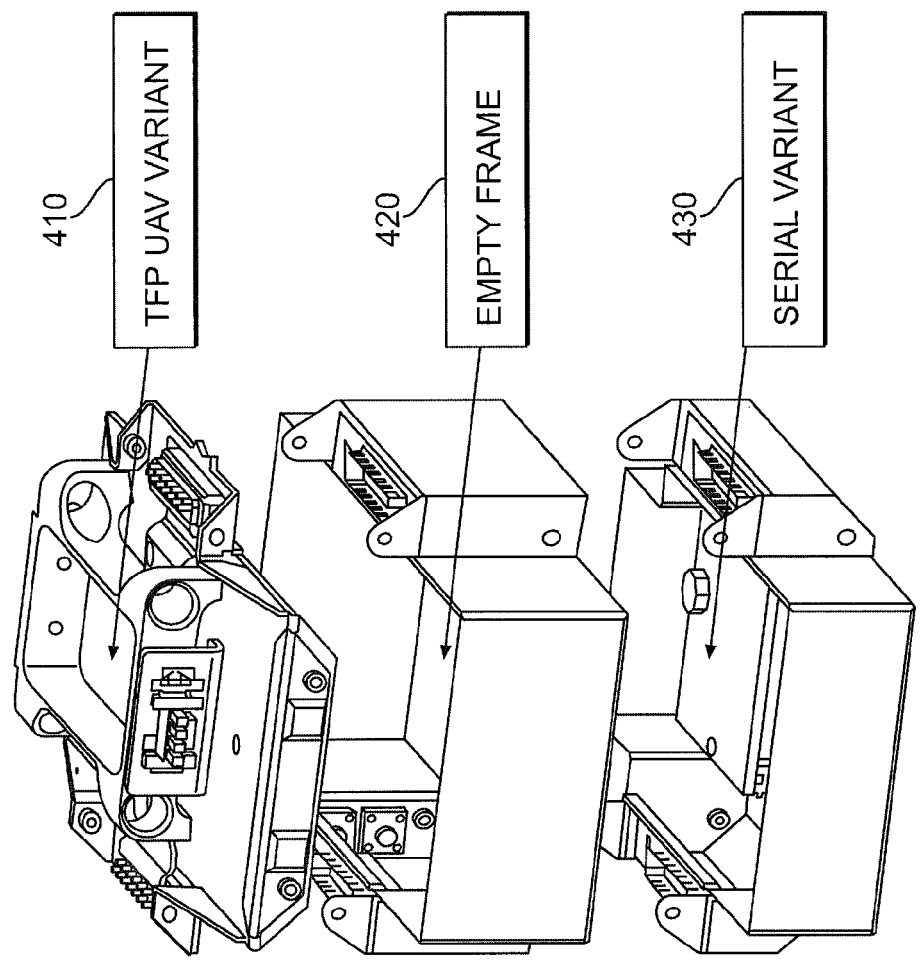
FIGS. 4 and 5 illustrate embodiments of system level components of the layered architecture of FIG. 1, for a TFP UAV variant and a ScanEagle UAV variant, respectively.
Figure 5:
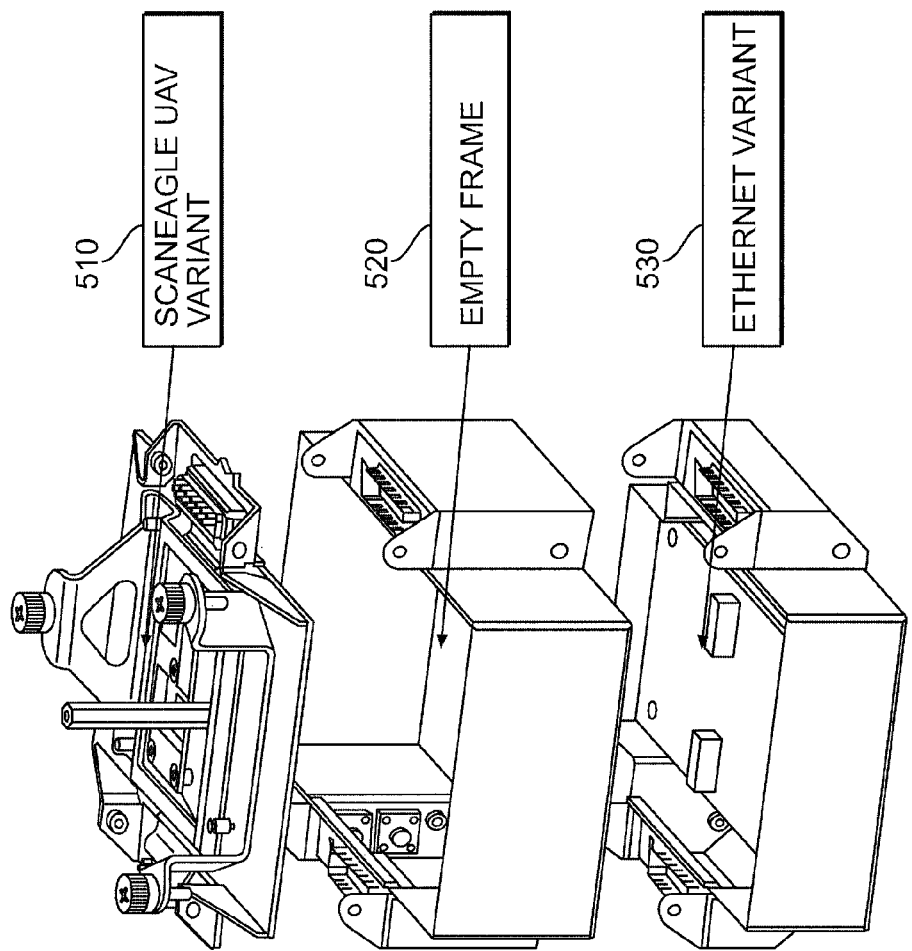

FIGS. 4 and 5 illustrate exemplary system level components of the layered architecture 100 of FIG. 1, for a TFP UAV variant 410 and a ScanEagle UAV variant 510, respectively. A serial data link variant 430 is shown in FIG. 4, while an Ethernet data link variant 530 is shown in FIG. 5. The serial data link variant 430 provides a data link transceiver with a serial data interface to the equipment layer 120 used for customer payload equipment communications to ground equipment. The Ethernet data link variant 530 provides a data link transceiver with an Ethernet data interface to the equipment layer 120 for customer payload equipment communications to ground equipment. Each model shows an empty equipment layer frame 420, 520, respectively, without any customer payload equipment 320 integrated. FIGS. 4 and 5 are for illustration purposes only and do not show other components that may be included for payload operation, such as cables, connectors, antennas, voltage regulators, data interface translators, and the like.

Figure 6:
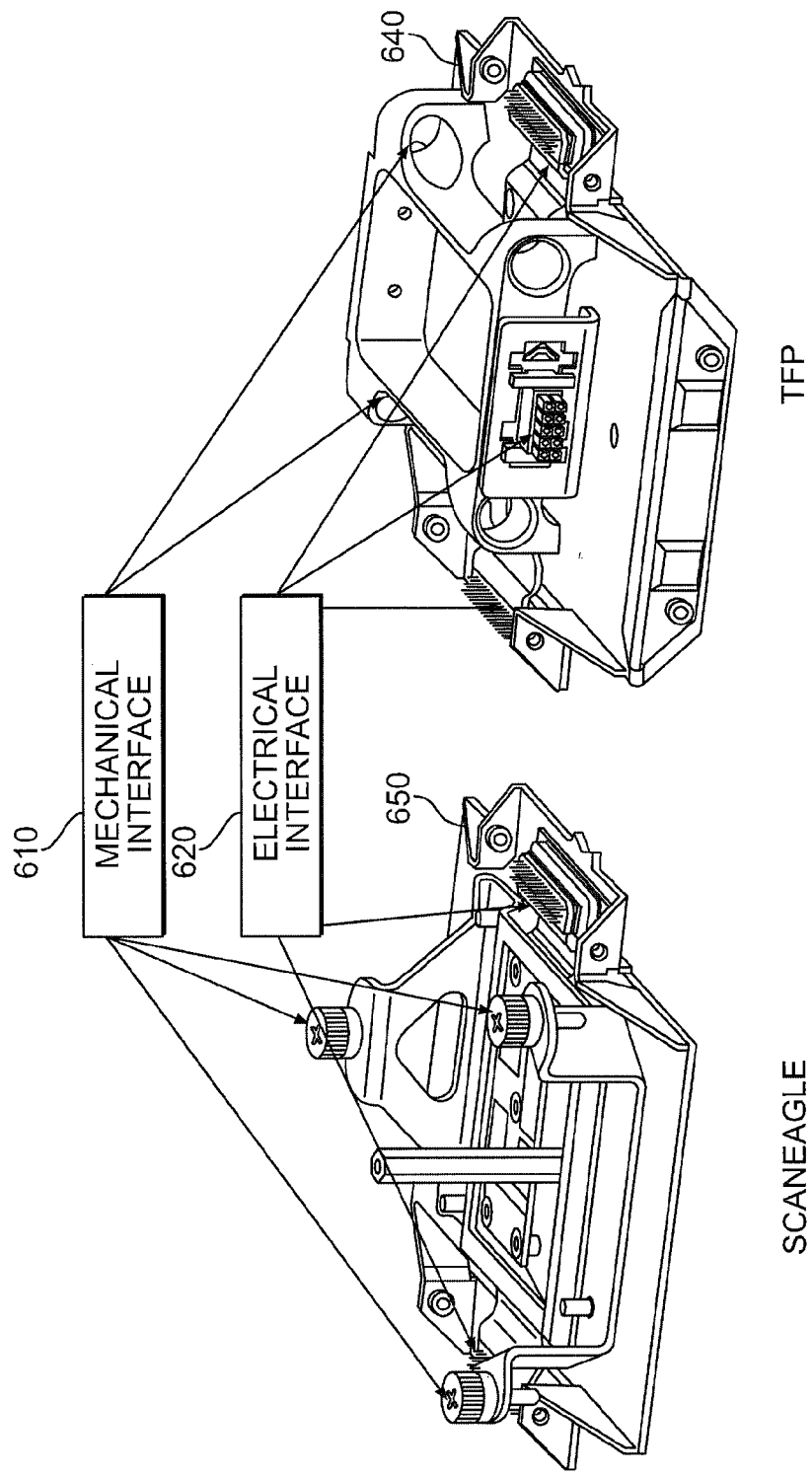
FIG. 6 illustrates exemplary embodiments of the platform layer for a TFP UAV variant and a ScanEagle UAV variant, respectively.

In embodiments of the layered architecture 100, each platform layer is specific to each UAV and may not be used in more than one UAV. For example, a platform layer of a TFP UAV variant 410 may not be used in the ScanEagle. FIG. 6 illustrates exemplary embodiments 640, 650 of the platform layer 110 for a TFP UAV variant 410 and a ScanEagle UAV variant 510, respectively. For each supported UAV system (e.g., TFP, BAT, Stalker and ScanEagle), a specific platform layer 110 is designed specifically for use with that UAV. The platform layer 640, 650 is designed to remove all unique mechanical interfaces and electrical interfaces of the UAV and convert these interfaces to the standard interfaces 115, 125 defined by the layered architecture 100. The existing UAV mechanical interfaces may be converted by providing a mechanical structure that can mount the layered architecture 100 components to the UAV 310. The mechanical structure may be used to transfer the load of the layered architecture 100 to the UAV mounts. Similarly, the existing UAV payload interface 312 electrical connections may be converted by electrical circuitry that complies with the requirements of the standard interfaces 115 and 125 to transfer the power, communications, and video signals to connectors. Platform layer designs may be provided for any UAV system, including TFP, BAT, Stalker, and ScanEagle systems, as well as for similar sized UAVs, such as the Integrator, Shadow, Viking 100 and the like.

Figure 7:
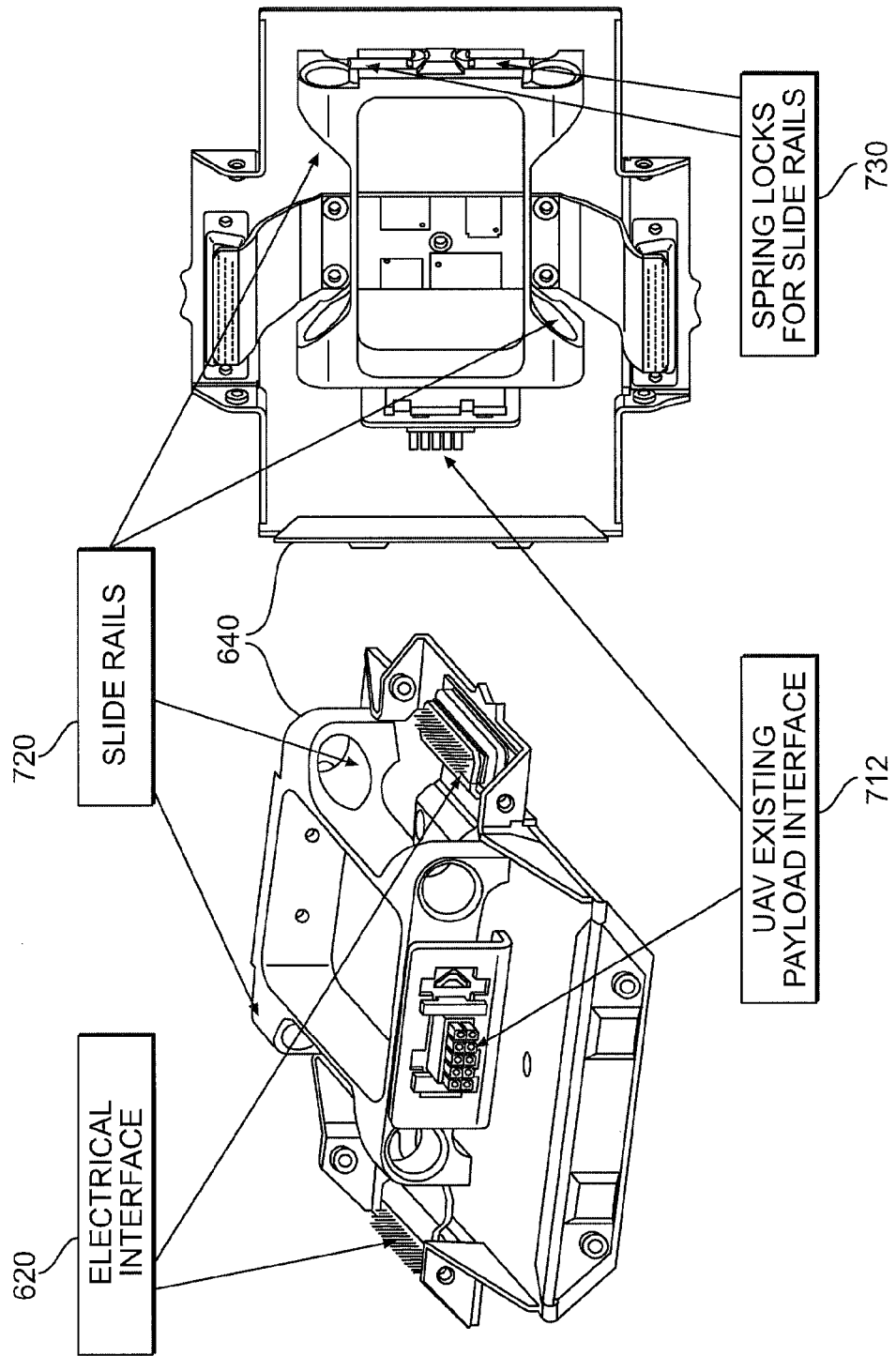
FIG. 7 shows the details of embodiments of interfaces on the platform layer for a TFP UAV variant.

FIG. 7 shows the details of the interfaces on the platform layer 110 for the TFP UAV variant 410. Referring to FIGS. 6 and 7, each UAV specific platform layer 640, 650 may include a UAV existing payload interface 712 that is specific to the existing UAV payload interface 312 on the UAV 310. The UAV existing payload interface 712 is generally different for each UAV, in connector type, supported signal types, number of signals, pinout, and the like. The platform layer 640, 650 may use electrical circuitry (e.g., printed circuit board, flex cable, or discrete wire harness) to convert the existing UAV payload interface 312 into the standard interface 115 by splitting it by function and routing the signals to appropriate electrical interfaces 620. Each UAV specific platform layer 640, 650 may also include a mechanical interface 610 that is unique to each supported UAV.

Referring to FIG. 7, the platform layer 640 is mounted to the aircraft using slide rails 720. An UAV existing payload interface 712 is mated once the payload is fully inserted and latched into place using spring locks 730. Other UAVs may have different mounting requirements, and thus may result in a unique mechanical design for that UAV.

Figure 8A:
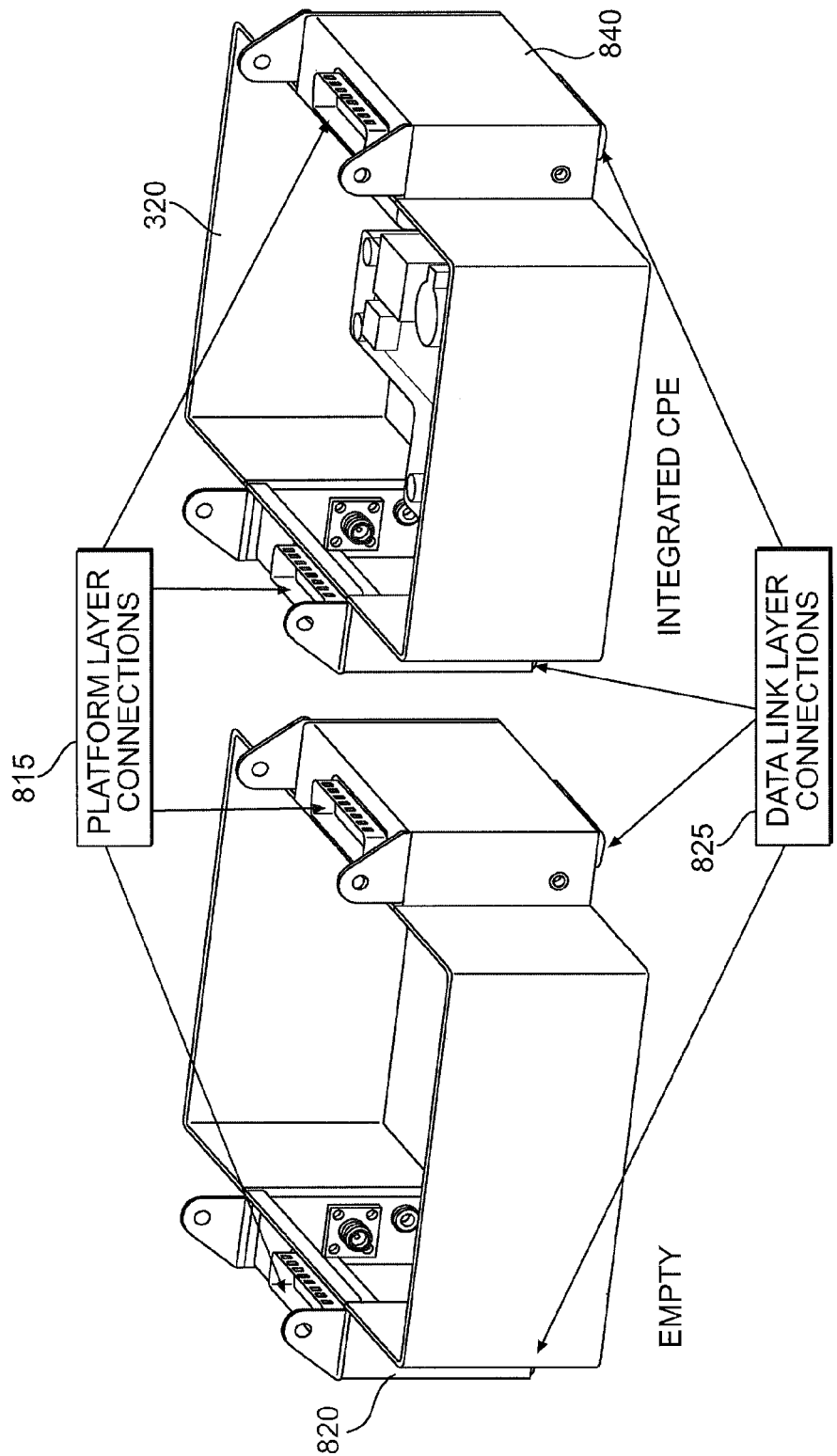
FIGS. 8A and 8B illustrate exemplary embodiments of the equipment layer of the layered architecture of FIG. 1.
Figure 8B:
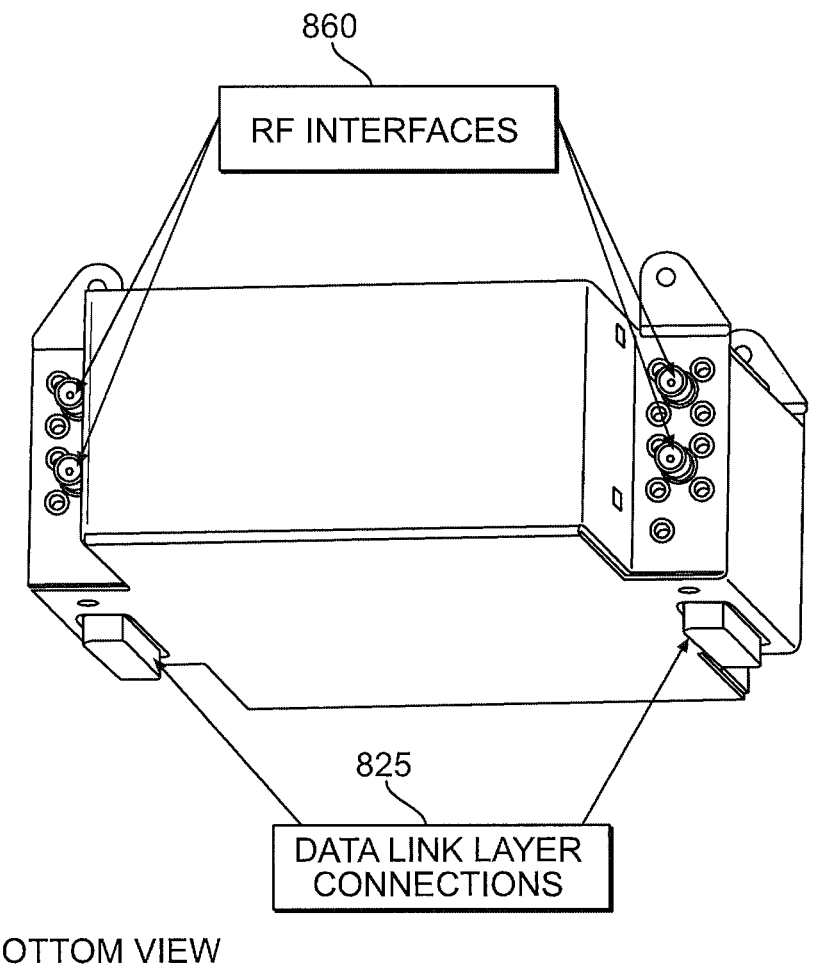

FIGS. 8A and 8B illustrate exemplary embodiments of the equipment layer 120 of the layered architecture 100. The equipment layer 120 allows a customer to easily add equipment to multiple UAVs with no modifications to the UAV or payload design. The equipment layer 120 may be used to house all customer payload equipment 320, and/or any peripheral equipment that may be needed for integration. Peripheral equipment may include items like a voltage regulator to create a needed but unsupplied voltage, or an interface convertor to perform data protocol translation, such as universal serial bus (USB) to Ethernet. The equipment layer 120 may be the only area of concern for the majority of customers and integration efforts.

The equipment layer 120 is primarily an empty mechanical housing 820, with access to the electrical interface connectors 815, 825. Customer payload equipment 320 can be mounted within the mechanical structure and wired to use the platform layer 110 and/or the data link layer 130 for data communications to ground control equipment. An equipment layer 120 with integrated customer payload equipment 320 is shown as 840. In the equipment layer 120, two sets of electrical interface connections exist. Platform layer connections 815 are used for connection to the platform layer 110 and data link layer connections 825 are used for connection to the data link layer 130. The equipment layer 120 may also include RF interfaces 860 for equipment that needs RF connections. The maximum size, weight, and power of customer payload equipment 320 that may be integrated vary depending on the UAV 310, platform layer 110, and data link layer 130 being used.

Figure 9:
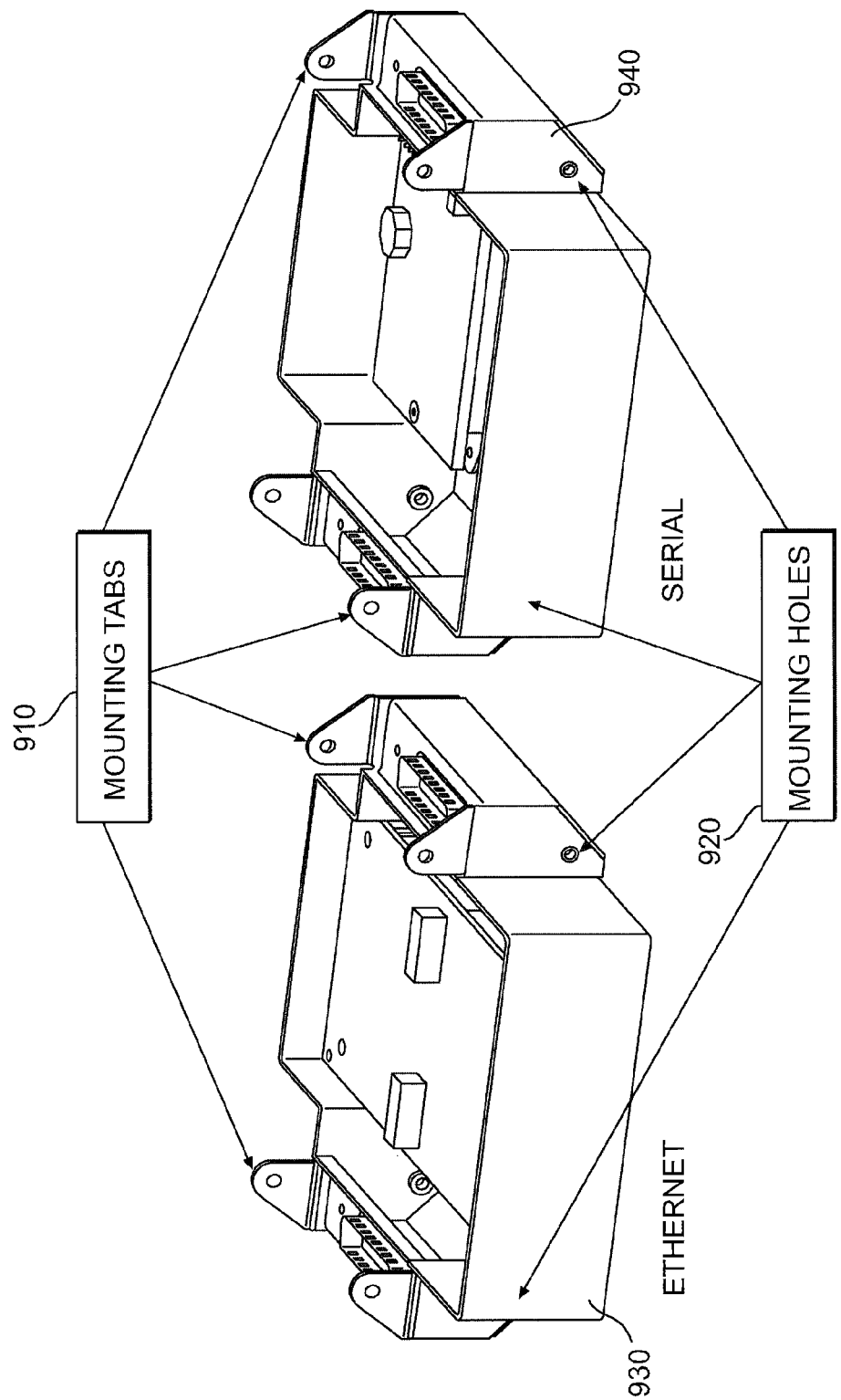
FIG. 9 illustrates exemplary embodiments of the data link layer of the layered architecture of FIG. 1.

FIG. 9 illustrates exemplary embodiments 930, 940 of the data link layer 130 of the layered architecture 100. An Ethernet data link layer component is shown as 930, and a serial data link layer component is shown as 940. The data link layer 130 is designed so that changes in data link transceiver technology do not affect the design of an entire payload. Every data link transceiver has specific characteristics, such as interface types, power requirements, baud rates, number of electrical interfaces, RF output power, RF connection type, and the like. The data link layer 130 removes all unique mechanical and electrical interfaces of a data link transceiver and converts these interfaces to the standard interface defined by the layered architecture 100. This conversion may be accomplished by integrating the data link transceiver into the data link layer 130 housing and rewiring the data link transceiver to the connectors defined by the standardized interface 125. Multiple data link layer variants currently exist. For example, a serial modem with one RS-232 interface capable of 115.2 kbps exists as the serial data link layer 940. Also, there is an Ethernet modem with one Ethernet and two RS-232 interfaces capable of a combined 867 kbps, which serves as the Ethernet data link layer 930. Any data link layer variant can be used across all supported aircraft, and can connect to the equipment layer 120 or to the platform layer 110 directly using, for example, mounting tabs 910 and mounting holes 920.

Figure 10:
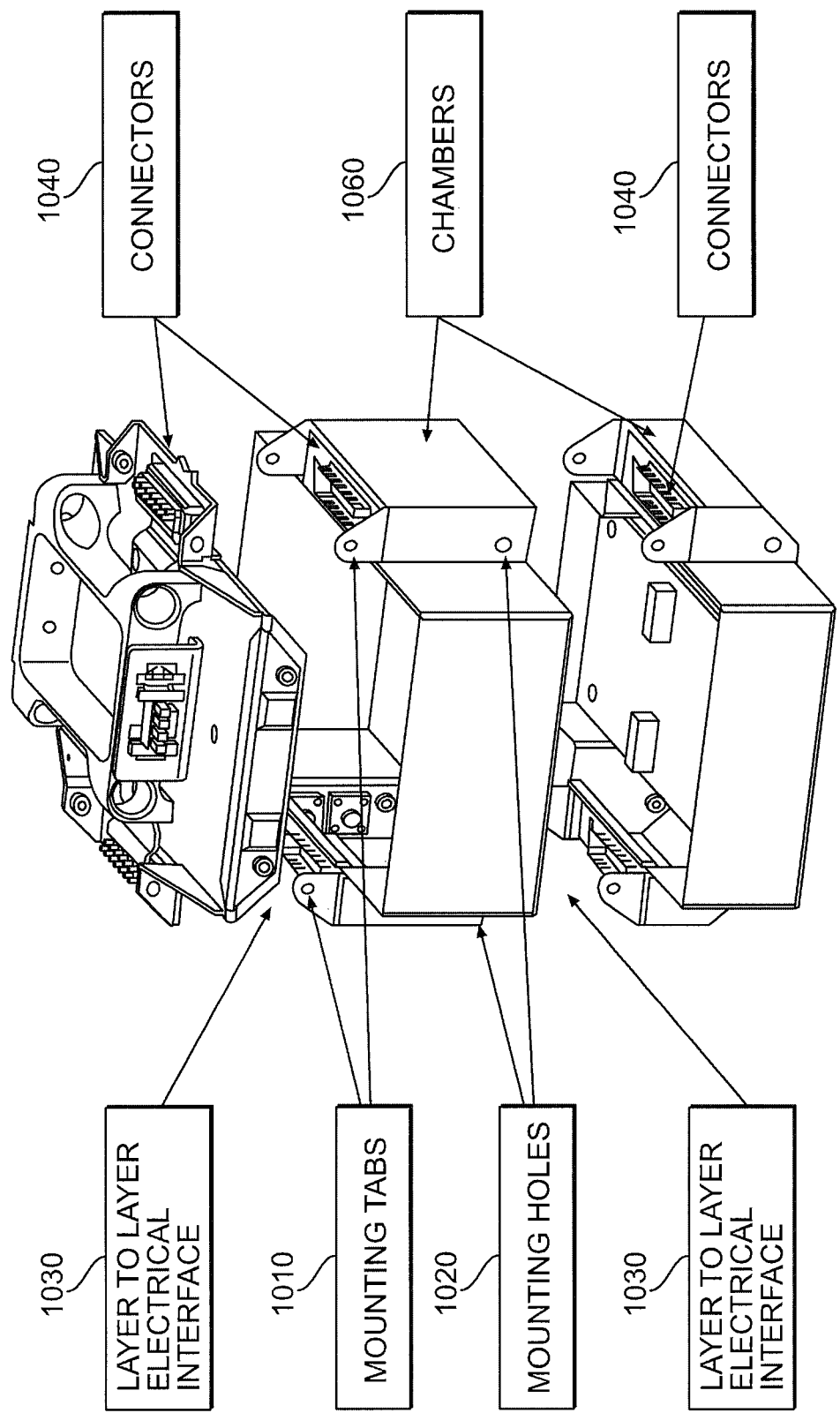
FIG. 10 illustrates an exemplary embodiment of layer to layer interfaces of the layered architecture of FIG. 1.

FIG. 10 illustrates an exemplary embodiment of layer to layer interfaces of the layered architecture 100. The layer to layer interfaces provide both mechanical interfaces (shown as mounting tabs 1010 and mounting holes 1020) and electrical interfaces 1030 in a simple and light weight design. The mounting tabs 1010 and the mounting holes 1020 may exist on each layer. The electrical and mechanical interfaces include two chambers 1060, one on each side of the layered architecture 100. The chambers may house the tabs, nuts, and screws for the mechanical interfaces and the electrical connectors and wiring/cabling for the electrical interfaces 1030.

From a mechanical perspective the chambers 1060 are part of the mechanical interface. The chambers 1060 provide a rigid structure to transfer loads from layer to layer, as well as to the aircraft. The lower sections of the chambers 1060 have mounting holes 1020 with built-in nuts that accept screws through mounting tabs 1010 on the top of the layers. The mounting tabs 1010 are also used to guide the layers into proper alignment during assembly, in addition to holding the layers together.

The layer to layer interface from the electrical perspective may be addressed using the electrical connectors 1040 of the electrical interfaces 1030 to pass electrical signals between layers. The connectors 1040 may be positioned towards the edge of the chambers 1060, not the center to ensure proper alignment and assembly of the layers. The connectors 1040 may also be keyed and gender specific to further prevent incorrect assembly between layers. During assembly, the connectors 1040 also hold the layers in correct alignment to ease the insertion of screws.

The layered architecture 100 is flexible, not only for equipment integration, but also for customer mission concept of operations. Because the layered architecture 100 is modular and allows quick reconfiguration, payload configurations can be adapted to address rapidly changing mission scenarios and requirements. Different configurations of the layered architecture 100 exist, as illustrated below.

Figure 11:
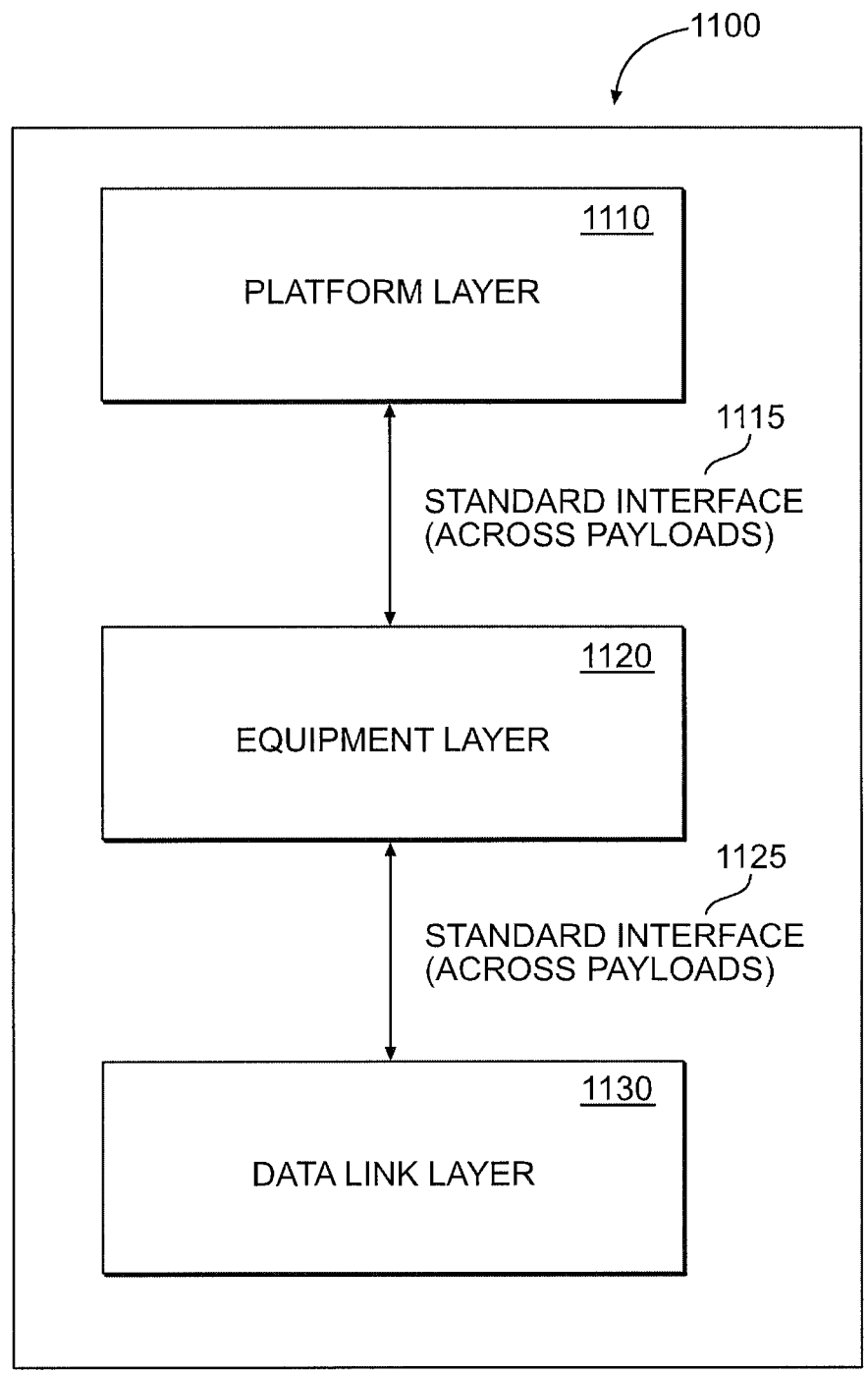
FIG. 11 illustrates an embodiment of a configuration that utilizes all three layers of a layered architecture, a platform layer, an equipment layer, and a data link layer.

FIG. 11 illustrates an exemplary configuration 1100 that utilizes all three layers of the layered architecture, i.e., a platform layer 1110, an equipment layer 1120, and a data link layer 1130. In this configuration 1100, customer payload equipment is housed in the equipment layer 1120. The customer payload equipment communicates to its associated ground equipment using the data link enclosed in the data link layer 1130. The platform layer 1110 provides mechanical and electrical interfacing to the UAV 310 (shown in FIG. 3). All three layers may be connected together using standard mechanical and electrical interfaces 1115, 1125.

Figure 12:
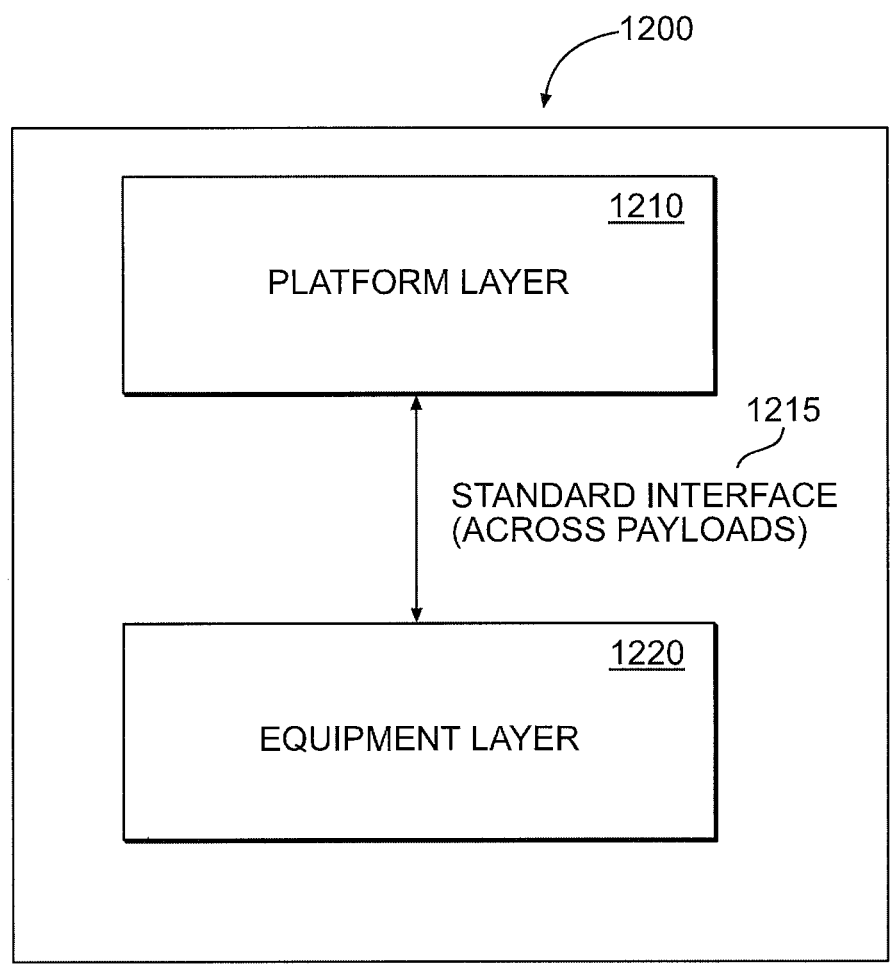
FIG. 12 illustrates an embodiment of a configuration that utilizes a platform layer and an equipment layer without a data link layer.

FIG. 12 illustrates an exemplary configuration 1200 that utilizes a platform layer 1210 and an equipment layer 1220 without a data link layer. This configuration 1200 uses the UAV's built in data link for communications between the ground equipment and an airborne system. The customer payload ground equipment may connect directly to a data port on the UAV ground control station. All command and control data to the airborne system may be passed over the UAV's built in data link and may be provided to the payload using standard mechanical and electrical interfaces 1215 on the platform layer 1210. For operation in this mode, coordination with UAV pilots may be needed to specify data port parameters and to enable data processing using the UAV's built in data link.

This configuration 1200 may also be useful for some payloads and missions that do not need real-time command and control and can operate autonomously. In this scenario, the customer payload equipment can operate with preprogrammed mission parameters. Such autonomous missions may only need the platform layer 1210 to obtain power from the UAV, and the equipment layer 1220 to contain the customer payload equipment. The equipment layer 1220 may connect to the platform layer 1210 using the standard mechanical and electrical interfaces 1215.

Figure 13:
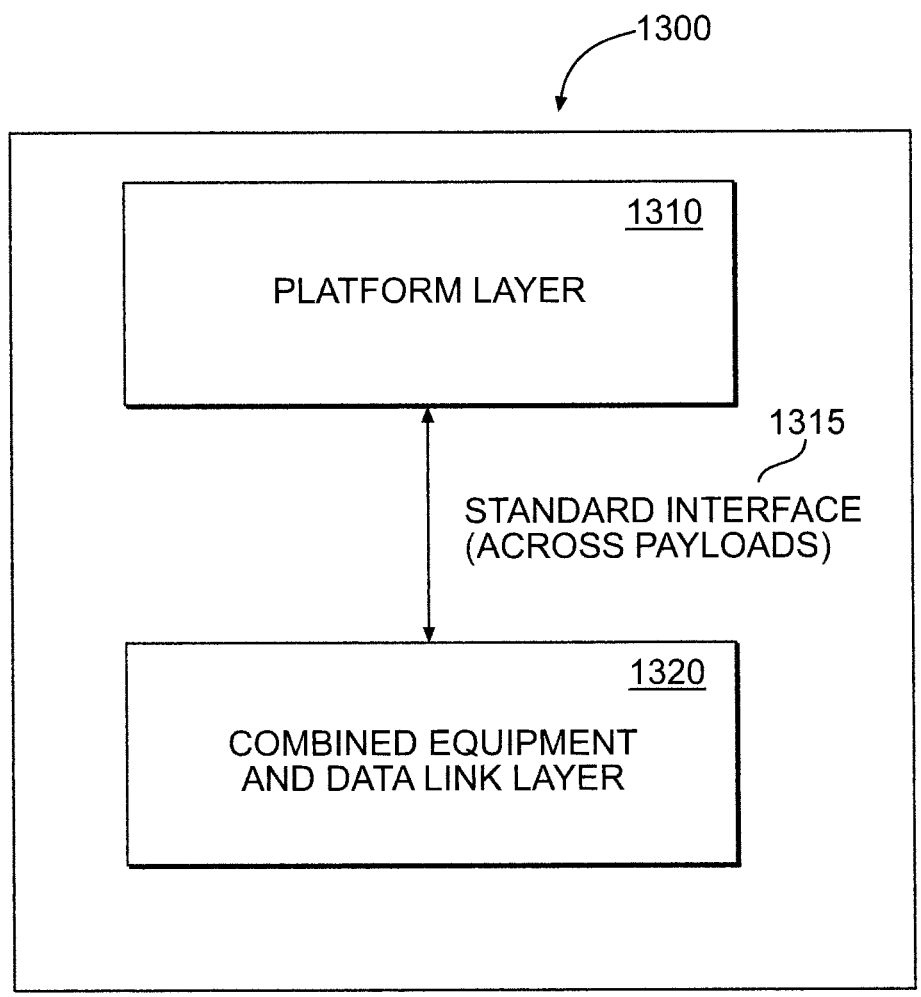
FIG. 13 illustrates an embodiment of a configuration that utilizes a platform layer and a combined equipment and data link layer.

FIG. 13 illustrates an exemplary configuration 1300 that utilizes a platform layer 1310 and a combined equipment and data link layer 1320. Depending on the mission need and customer payload equipment requirements, the equipment layer 120 and the data link layer 130 may be combined (electrically and mechanically) in some instances to reduce design complexity and overall payload size, weight, and power. Some customer payload equipment 320 may benefit from the simplicity of a combined design that allows field operators to switch customer payload equipment between UAVs, but does not allow data link reconfigurations. This configuration 1300 reduces the number of possible reconfigurations that are possible. However, this configuration 1300 may save weight and increase internal equipment volume compared to the split layer configuration 1100. The combined layer design may be used to reduce the overall system size and weight, therefore allowing a payload that may not meet the UAV's size, weight, and power requirements to now be flight worthy. The combined layer 1320 may connect to the platform layer 1310 using standard mechanical and electrical interfaces 1315.

Figure 14:
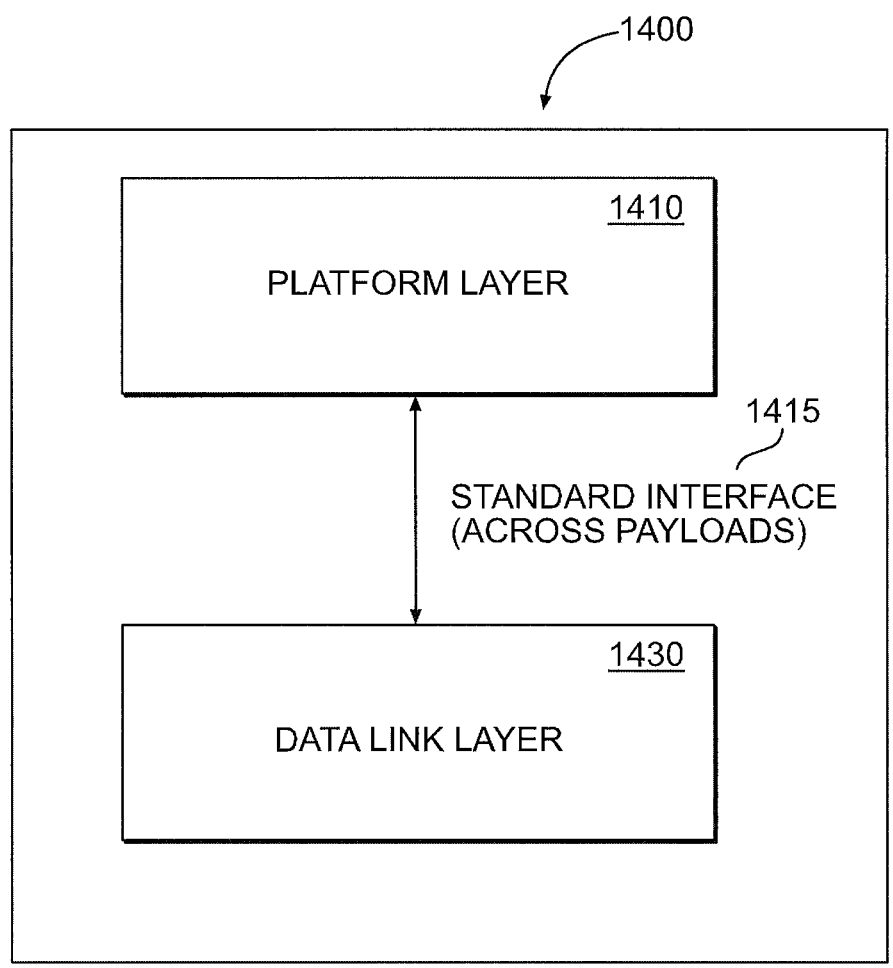
FIG. 14 illustrates an embodiment of a configuration that utilizes a platform layer and a data link layer.

FIG. 14 illustrates an exemplary configuration 1400 that utilizes a platform layer 1410 and a data link layer 1430. This configuration may be referred to as an airborne relay station. Some customers may want the payload to act as a relay platform, providing communications to and from the ground control station to another remote ground site or another aircraft. In this configuration 1400, data is sent from the ground control station to the airborne payload, and then relayed to another site. This configuration 1400 can be useful for communicating with customer payload equipment that is not within line-of-site of the ground control equipment. The aircraft can be used to overcome the line-of-site obstacles, or to increase the communication range by adding another node between the ground control station and the remote customer payload equipment. The data link layer 1430 may connect to the platform layer 1410 using standard mechanical and electrical interfaces 1415.

The realized improvements of the layered architecture include the following: 1) it supports operation on multiple platforms; 2) the stacking architecture simplifies mechanical interface design and reduces size, weight, and power; 3) the double-sided electrical interface increases layer reconfiguration possibilities and allows for redundancy; 4) it reduces the design time to meet QRC needs due to a simplified integration approach and possible reuse of existing layer modules; 5) reuse of existing layer designs can be accomplished on all supported platforms; 6) changes in technology or functional requirements for one layer do not force changes to adjacent layers; 7) it provides a rugged, robust design with environmental, EMI, and thermal protection due to fully encapsulated wiring and components; 8) it reduces the repair time/effort required for in-field use; 9) multiple layers provide multiple channel/multiple function capability without additional design effort; 10) multiple layers provide for equipment redundancy without additional design effort; and 11) each layer can auto-detect its place in the stack to auto-identify and provide self-configuration of multiple channels or master/slave or primary/backup relationships in redundant applications.

The layered architecture 100 reduces the effort and schedule required for QRC integration projects of new equipment or new platforms. Moreover, the layered architecture 100 creates a modular system that greatly improves a customer's ability to make payload components interchangeable, stackable, and replaceable in the field without extensive training or technical skill due to modularity and easy connect/disconnect interfaces. Similarly, because the layers are split by function, each layer can be updated and improved as needed without requiring redesign of the adjacent layers as technologies change. Overall, the customer receives a design that better fulfills their mission requirements with improved performance, and greater mission capability. In addition to UAVs, the layered architecture 100 can be applied to other unmanned systems, such as ground and maritime vehicles, or to manned platforms and systems as well.

Figure 15:
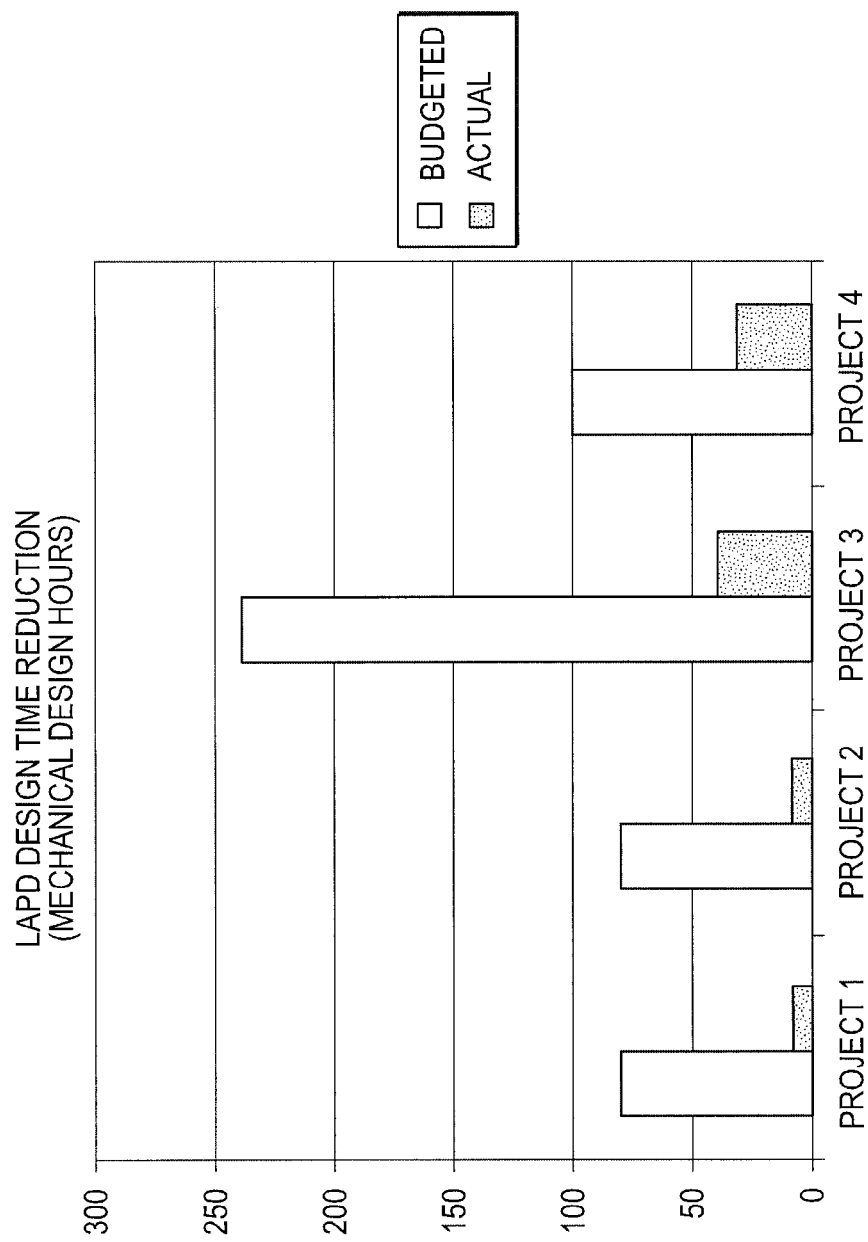
FIG. 15 is a bar graph illustrating a comparison of design times needed for four new payloads using an embodiment of the layered architecture and using a legacy process.

For example, FIG. 15 illustrates an exemplary comparison of the design time needed for four new payloads using the layered architecture 100 and the design time needed using the legacy process that designs each system as a unique payload. The layered architecture 100 yields a great reduction in effort. Referring to FIG. 15, the actual time needed for four integration projects of customer payload equipment into an equipment layer of the layered architecture 100 is much less than the time estimated to design a unique payload for each system.

Figure 16:
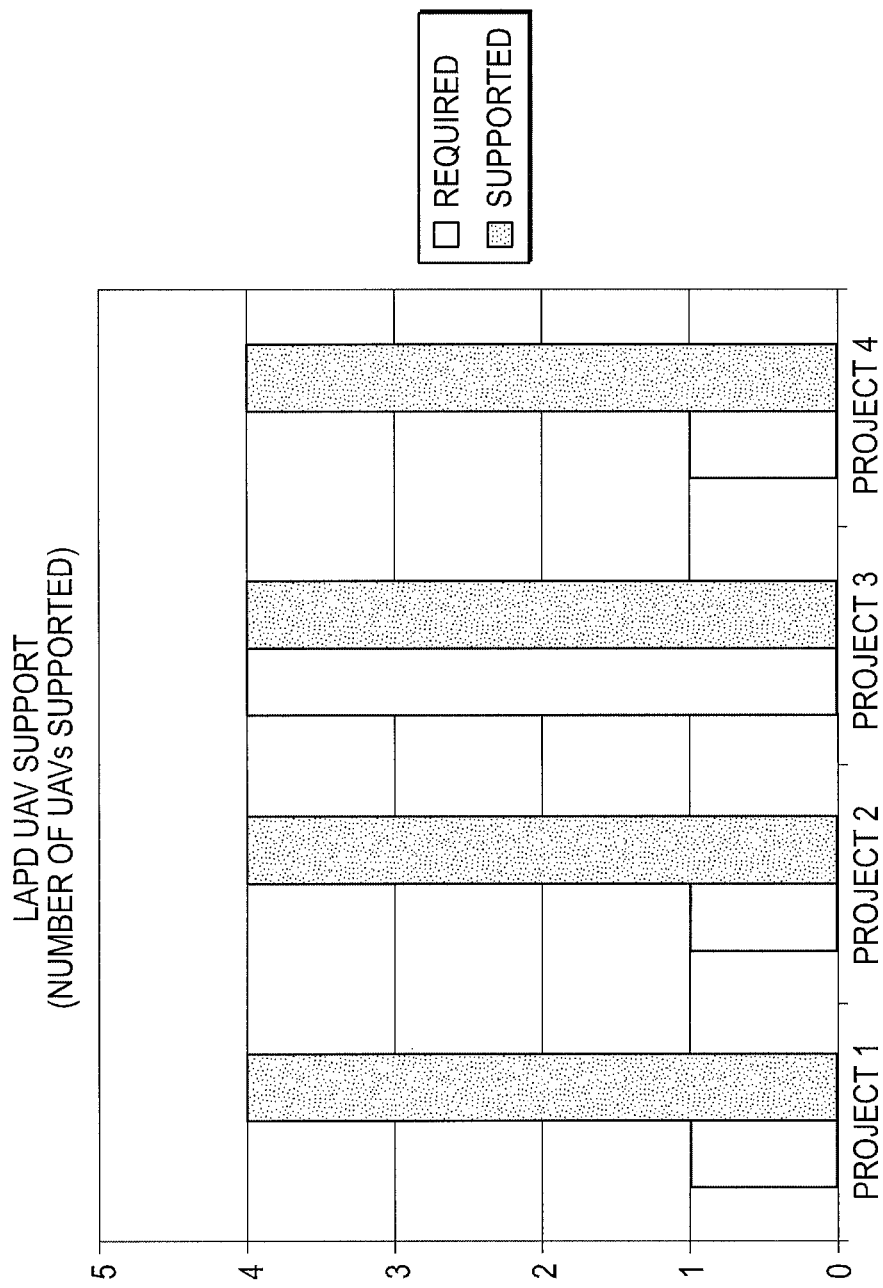

FIG. 16 illustrates an exemplary comparison of the number of UAVs each payload may operate on using the layered architecture 100 and the number of UAVs each payload was required to operate on. Again, the layered architecture 100 shows another great improvement. For example, once a payload is integrated into an equipment layer of the layered architecture 100, the payload may be used on any UAV and may connect to any data link layer component that is already supported by the layered architecture 100.

In summary, the layered architecture 100 is highly adaptable and meets the needs of many customers using UAVs. The layered architecture 100 supports operation onboard numerous UAVs, and also allows for quick and easy mission reconfiguration through the use of plug and play modules. This flexibility greatly improves customers' abilities to meet their mission needs quickly and effectively by allowing them to choose only the required components and configure them in the best manner to meet their needs. Customers are afforded the opportunity to grow or shrink the payload to meet the size, weight, and power of the UAV they will be using, and to tailor the payload design based on performance requirements of the UAV and mission. Likewise, the layered architecture 100 may be manufactured in a number of different materials allowing it be further adapted to the mission needs based on EMI/RF requirements, weight considerations, thermal characteristics, and the like. Overall, the layered architecture 100 reduces design time and cost, increases reusability, and allows customers to quickly and cheaply produce a system for test, demonstration, production and/or operation.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A layered architecture for customer payload systems in unmanned aerial vehicles (UAVs), comprising:
    a platform layer that provides standard mechanical interfaces and electrical interfaces of an unmanned aerial vehicle (UAV);
    an equipment layer, wherein the equipment layer comprises a housing that contains customer payload equipment, wherein a video source is embedded into the customer payload equipment and the video source is a camera;
    a data link layer that contains a data link transceiver for controlling the customer payload equipment;
    a first standard interface between the platform layer and the equipment layer to enable two or more platform and equipment layer components to be compatible with each other; and
    a second standard interface between the equipment layer and the data link layer to enable two or more equipment and data link layer components to be compatible with each other.

2. The layered architecture of claim 1, wherein the equipment layer contains peripheral components unique to the customer payload equipment.

3. The layered architecture of claim 1, wherein the platform layer provides power from the UAV to the equipment layer and the data link layer.

4. The layered architecture of claim 1, wherein the platform layer provides data paths between the UAV and the equipment layer.

5. The layered architecture of claim 1, wherein the equipment layer communicates to ground equipment using the data link layer or a built-in data link on the UAV through the platform layer.

6. The layered architecture of claim 1, wherein the data link layer includes peripheral equipment, including one or more of global positioning systems (GPS), power supplies, voltage regulators, and signal distribution systems.

7. The layered architecture of claim 1, wherein the platform layer includes a UAV payload interface, wherein power is supplied from the UAV to the platform layer using an existing UAV payload interface and the UAV payload interface.

8. The layered architecture of claim 1, wherein video data obtained from the video source is routed from the layered architecture through the platform layer to the UAV payload interface and then transmitted to a UAV ground control station using an existing video data link and bandwidth provided by the UAV.

9. The layered architecture of claim 1, wherein each of the platform layer, the equipment layer, and the data link layer includes one or more data interfaces for transmitting bi-directional command and control data between an unmanned aerial vehicle (UAV) and the layered architecture.

10. The layered architecture of claim 9, wherein the equipment layer performs data protocol translations from a UAV supported protocol to other protocols.

11. The layered architecture of claim 1, wherein the equipment layer includes one or more radio frequency (RF) interfaces for systems that need RF connections.

12. The layered architecture of claim 1, wherein the data link layer includes one or more radio frequency (RF) interfaces for systems that need RF connections.

13. The layered architecture of claim 1, wherein the equipment layer enables equipment to be added to unmanned aerial vehicles (UAVs) with no modifications to the UAVs.

14. The layered architecture of claim 1, wherein the equipment layer and the data link layer are combined into one mechanical housing.

15. The layered architecture of claim 1, wherein the first standard interface and the second standard interface are electrically equivalent so that the data link layer can plug into and obtain power from the platform layer.

16. The layered architecture of claim 1, wherein at least two of the platform layer, the equipment layer, and the data link layer are stackable via the first standard interface or the second standard interface whereby one of the stacked layers serves as a lid to another of the stacked layers.

17. The layered architecture of claim 16, wherein the at least one of the first standard interface or the second standard interface is double-sided.

18. A layered architecture for customer payload systems in unmanned aerial vehicles (UAVs), comprising:
a platform layer that provides standard mechanical interfaces and electrical interfaces of a unmanned aerial vehicle (UAV);
an equipment layer, wherein the equipment layer comprises a housing that contains customer payload equipment; and
a standard interface between the platform layer and the equipment layer to enable two or more platform and equipment layer components to be compatible with each other;
wherein the equipment layer communicates to ground equipment using a built-in data link on the UAV; and
wherein the platform layer and the equipment layer are stackable via the standard interface whereby either the equipment layer serves as a lid to the platform layer or the platform layer serves as a lid to the equipment layer.

19. The layered architecture of claim 18, wherein the equipment layer contains peripheral components unique to the customer payload equipment.

20. The layered architecture of claim 18, wherein the platform layer includes a UAV payload interface, wherein power is supplied from the UAV to the platform layer using an existing UAV payload interface and the platform layer's UAV payload interface.

21. The layered architecture of claim 18, further comprising a video source embedded into the customer payload equipment, wherein the video source is a camera.

22. The layered architecture of claim 21, wherein video data obtained from the video source is routed from the layered architecture through the platform layer to the UAV payload interface and then transmitted to a UAV ground control station using an existing video data link and bandwidth provided by the UAV.

23. The layered architecture of claim 18, wherein the standard interface is double-sided.

24. The layered architecture of claim 18, wherein standard interfaces are provided on opposite sides of the equipment layer and are separated by the housing which is located therebetween.

25. A layered architecture for customer payload systems in unmanned aerial vehicles, comprising:
a platform layer that standardizes mechanical interfaces and electrical interfaces of a unmanned aerial vehicle (UAV);
a data link layer that contains a data link transceiver for controlling customer payload equipment; and
a standard interface between the platform layer and the data link layer to enable two or more platform and data link layer components to be compatible with each other, wherein the platform layer and the data link layer are stackable via the standard interface whereby either the data link layer serves as a lid to the platform layer or the platform layer serves as a lid to the data link layer;
wherein data is sent from a ground control station to the UAV and then relayed to a remote site.

26. The layered architecture of claim 25, wherein the platform layer includes a UAV payload interface, wherein power is supplied from the UAV to the platform layer using an existing UAV payload interface and the platform layer's UAV payload interface.

27. The layered architecture of claim 26, further comprising a video source embedded into the data link layer.

28. The layered architecture of claim 27, wherein video data obtained from the video source is routed from the layered architecture through the platform layer to the UAV payload interface and then transmitted to a UAV ground control station using an existing video data link and bandwidth provided by the UAV.

29. The layered architecture of claim 25, wherein the standard interface is double-sided.

* * * * *